US010461684B1

(12) United States Patent
Rubin (10) Patent No.: US 10,461,684 B1
(45) Date of Patent: Oct. 29, 2019

(54) DEVICE AND METHOD OF A ROTATABLE PHOTOVOLTAIC PANEL MOUNT

(71) Applicant: Kim Rubin, Menlo Park, CA (US)

(72) Inventor: Kim Rubin, Menlo Park, CA (US)

(73) Assignee: Kim Rubin, Menlo Park, CA (US)

( * ) Notice: Subject to any disclaimer, the term of this patent is extended or adjusted under 35 U.S.C. 154(b) by 0 days.

(21) Appl. No.: 16/421,144

(22) Filed: May 23, 2019

(51) Int. Cl.
H02S 20/30 (2014.01)
H02S 20/23 (2014.01)

(52) U.S. Cl.
CPC ............. *H02S 20/30* (2014.12); *H02S 20/23* (2014.12)

(58) Field of Classification Search
CPC ................................ H02S 20/30; H02S 20/23
See application file for complete search history.

(56) References Cited

U.S. PATENT DOCUMENTS

| | | | | |
|---|---|---|---|---|
| 4,371,139 A * | 2/1983 | Clark | ...................... | F24S 20/67 248/237 |
| 4,421,943 A * | 12/1983 | Withjack | ................ | H02S 20/30 136/246 |
| 6,058,930 A * | 5/2000 | Shingleton | ............ | F24S 30/425 126/600 |
| 8,324,496 B1 * | 12/2012 | Gross | ...................... | F24S 40/85 136/246 |
| 8,492,645 B1 * | 7/2013 | Strahm | ................ | H01L 31/054 136/244 |
| 8,536,442 B2 * | 9/2013 | Stancel | ................ | F24S 25/632 136/251 |
| 8,991,115 B2 * | 3/2015 | Hubbard | .................. | A62C 2/24 52/173.3 |
| 9,799,786 B2 * | 10/2017 | Kim | ........................ | H02S 30/10 |
| 10,024,579 B1 * | 7/2018 | Govar | ..................... | H02S 20/30 |
| 2007/0151594 A1 * | 7/2007 | Mascolo | ................. | H02S 20/23 136/245 |
| 2008/0040990 A1 * | 2/2008 | Vendig | .................... | H02S 20/32 52/173.3 |
| 2009/0120016 A1 * | 5/2009 | Hon | ........................ | H02S 20/00 52/173.3 |
| 2010/0193013 A1 * | 8/2010 | Kong | ..................... | H02S 20/30 136/251 |

(Continued)

OTHER PUBLICATIONS https://www.quickmountpv.com/products/qrail.html?utm_source=website-homepage&utm_medium=banner&utm_campaign=QRail; retrieved May 23, 2019.

(Continued)

*Primary Examiner* — Rodney Mintz
(74) *Attorney, Agent, or Firm* — Kim Rubin (57) ABSTRACT

A device and method for a rotatable photovoltaic (PV) panel mount is described. A moving frame, comprising a standard PV panel, connects via a hinge to a fixed frame. In an "operative" position, the moving frame and its PV panel are coplanar with a larger, fixed array of PV panels. A spring between the fixed frame and the moving frame powers the moving frame to rotate around the hinge pivot from horizontal (operative) to vertical (roof access), when an emergency handle releases a latch. This "roof access" position now allows roof access through a portion of the roof that was covered by the moving frame in its operative position. A damper, such as a flywheel, limits the rotational speed and prevents injury or damage. Embodiments include kits, installation of embodiments, and use of the invention to access a roof portion in a fire emergency.

17 Claims, 8 Drawing Sheets

(56) References Cited

U.S. PATENT DOCUMENTS

| | | | |
|---|---|---|---|
| 2010/0243023 A1* | 9/2010 | Patton | H02S 20/24 |
| | | | 136/244 |
| 2010/0269888 A1* | 10/2010 | Johnston, Jr. | H02S 20/30 |
| | | | 136/251 |
| 2010/0269889 A1* | 10/2010 | Reinhold | F24S 25/12 |
| | | | 136/251 |
| 2012/0318322 A1* | 12/2012 | Lanyon | H02S 20/23 |
| | | | 136/244 |
| 2013/0205692 A1* | 8/2013 | Hubbard | A62C 2/24 |
| | | | 52/173.3 |
| 2013/0240008 A1* | 9/2013 | Baker | H02S 20/00 |
| | | | 136/244 |
| 2014/0060624 A1* | 3/2014 | Kim | H02S 30/10 |
| | | | 136/251 |
| 2017/0229997 A1* | 8/2017 | Van Otten | F16M 11/12 |

OTHER PUBLICATIONS https://www.ironridge.com/pitched-roof-mounting/360view/; retrieved May 23, 2019.
https://www.panelclaw.com/clawfr/#clawFR%2010D; retrieved May 23, 2019.
https://unirac.com/roofmount/rm10/; retrieved May 23, 2019.

* cited by examiner

DEVICE AND METHOD OF A ROTATABLE PHOTOVOLTAIC PANEL MOUNT

BACKGROUND

Photovoltaic (PV) panels and panel arrays are commonly used on residential and commercial roofs to generate electricity. Individual panels are typically secured to a roof using first, a set of roof penetration mounts each comprising a vertical post; second, a set of rails, or struts, that attach to the penetration mount posts; and third, a set of panel clamps that secure an array of PV panels to the struts. Two sets of parallel struts may be used, typically perpendicular to each other.

Typically, fire codes or building codes have a requirement that a portion of the supporting roof remain clear of PV panels and other hardware so that the roof may be penetrated rapidly by a fire fighter cutting a hole. As a result, prior art installation of PV panels generally do not extend to the edge of a roof, but rather leave a substantial gap between an edge of the panel array and each edge of a roof. Such a gap significantly reduces total available panel area.

Prior art photovoltaic mounting systems consist of two orthogonal sets of support struts. Typically the lower set, attached to the surface of a sloped roof, is aligned with the roof's structural members, such as joists. The upper set of struts, mounted orthogonally on the lower struts, are spaced such that perimeters of photovoltaic (PV) panels mount easily. Such an arrangement holds the PV panels securely. As mounted, PV panels in such an array have no moving parts.

SUMMARY OF THE INVENTION

Embodiments of this invention overcome the weaknesses of prior art. A PV panel mount, mechanical system and a method of use are described that permits a PV panel near the edge of the roof to simply and rapidly be rotated away from the roof to permit emergency access to a portion of the roof previously covered or blocked by the panel.

Major embodiments include: first, a mechanical system that mounts to a roof and accepts a standard PV panel, and second, the same mechanical system with a PV panel included. We refer to this PV panel as a, "fire access panel," in part, to differentiate it from other PV panels mounted rigidly, typically nearby, in what we refer to as the, "full panel array."

The fire access PV panel mounts in a moving frame, which is an element in embodiments. We may refer to either the PV panel itself, or the PV panel together with its moving frame, as a fire access panel, or as a moving panel, or as a moving frame. When we refer to a PV panel we often shorten the phrase to simply, "panel."

Major elements of embodiments include: (1) a moving frame to hold a standard PV panel; (2) a fixed frame secured to the roof; (3) a release latch to hold the moving frame in an operative position; (4) a release handle, that when pulled, causes the moving frame to rotate from an operative position to an access position; (5) a spring to power the rotational movement of the moving panel from an operative position to an access position; (6) a damper to control the rate of rotation; (7) a hinge, pivot or bearing around which the moving frame rotates between its three positions. Roof mount elements are also required to secure the fixed frame to a roof or other support structure.

The moving frame is spring loaded, holding its associate PV panel in an operative position with a latch. A simple emergency access release handle releases the latch, allowing the moving frame with its associated PV panel to automatically rotate upward to an access position, which is nominally perpendicular to the operative position. In addition, the panel may easily be pushed downward by hand to be flat, "face down," on top of an adjacent panel. In both the access and folded position the roof underneath the fire access panel is exposed for access onto the roof, or through the roof, for emergency access, such as for fire fighters. No panels are damaged by these actions. The fire access panel may be manually flipped back to an operative position: face up and typically coplanar with the remainder of the full panel array.

We define, for convenience, three positions for the moving frame: (1) "Operative," when it is face up and typically co-planer with the rest of full PV panel array, secure against wind, and able to generate electricity just like the other panels in the array. (2) "Access," where it is rotated to be generally perpendicular to the operative position. (3) "Folded," where it is face down on top of an adjacent panel. Although we generally discuss embodiments that include a single fixed frame and a single moving frame with a single PV panel, many installations will use multiple fire access panels. The folded position is optional. Movement from the operative position to the access position is automatic, once the release handle is pulled. Movement from the release position to the folded position may be manual, such as simply pushing the panel into that position. Restoring the moving frame to the operative position is typically done manually.

No tools are required to move a moving frame between any of its three positions.

BRIEF DESCRIPTION OF THE DRAWINGS

FIG. 3 shows a side view, where a mount, fixed frame, moving frame, spring, spring base, damping flywheel, release handle and hinge pivot are visible. FIG. 3 also shows an "over the roof edge" release cable.

DETAILED DESCRIPTION

Scenarios, drawings and options are non-limiting, exemplary embodiments.

The technical problem to solve is: how to provide rapid, simple, reliable access to a roof surface that is normally covered by an operative PV panel. There are additional practical requirement for a solution. The assembly must be installable with minimal additional instructions using skills and tools now used regularly by PV panel array installers. Operation of embodiments by fire fighters must be obvious, even with no prior experience or training on such embodiments. Embodiments should continue to function properly with no maintenance for ten to twenty years. Operation of fire access panel should not put anyone at risk of injury nor cause any damage.

A summary of elements, in one embodiment, includes the following.

A fixed frame 108 is attached to a roof or other support structure. Typically this is the same support structure that holds the fixed PV panels in the rest of the full PV panel array. Typically, roofs are sloped and the panels in the array are mounted proximal to and planer to the roof. An alternative support structure includes generally triangular frames so that panels may be appropriately angled up from a flat or gently slopped roof for an optimum angle to the sun. Such a support structure may be made of pipe, conduit, wood, fiberglass, concrete, structural steel, or other suitable material. The fixed frame stays in a fixed position, permanently mounted to the roof or other support. Access to the roof may be through a central portion of the fixed frame.

Secured to the fixed frame is a hinge or hinge assembly. The moving frame 115 and associated PV panel rotate around the hinge pivot or axis when the panel is moved from an operative position to an access position and to an optional folded position. Also secured directly or indirectly to the fixed frame is at least a portion of a release latch. The moving frame 115 is secured in an operative position via the release latch. A spring (or another mechanism that provides a rotational force) is secured, directly or indirectly, at one end, to the fixed frame. The other end of the spring is secured, directly or indirectly, to the moving frame 115 or the panel support frame.

A release handle 120 releases the moving frame 115 from the latch 121, wherein the moving frame 115 then rotates from an operative position to an access position, powered by the spring. If desired, the moving frame 115 may then be pushed by hand into a folded position. A second latch, gravity, the spring, or a second spring may optionally be used to hold or secure the moving frame 115 in a folded position. In some embodiments, the spring powers the rotation of the moving frame 115 fully to the folded position. In such an embodiment, the folded position may be viewed as also being an access position.

In typical operation, a roof holds the fixed frame 108, which in turn holds the 110, the "fire access panel." A fire fighter, needing access to the roof, such as to penetrate the roof to access a fire under the roof, pulls the release handle 120, causing the moving frame 115, and its associated PV panel 110, to rotate to an access position, exposing an open region of the roof within the fixed frame. If desired, the moving frame 115, with the panel frame and panel, may be manually rotated either back to the operative position or folded over ("face down") onto an adjacent panel on the full PV array.

Additional latches, mounts, bumpers or similar elements may be employed along the edges or corners between the fixed frame and the moving frame 115 to assist in restraining motion of the fixed frame in the operative position.

In describing embodiments, terms are often used that may be construed as either structural elements or an element that provides a means to a function. For example, the term, "spring," may describe either an element or a function. In general, construction should be for an element, not a function. However, under the rule of equivalents, a similar device that performs a similar function for the same purpose is also within the scope of a claim. However, the full context of any term is required for proper construction. In general, terms should be construed using terms of the art, which is typically mechanical structures, unless otherwise specified herein.

SUMMARY OF ELEMENTS

The list below summarizes exemplary elements in drawings. The same reference designator used in different drawings is for the same element type. Note that in embodiments, one element type may be used in multiple locations.
100—Plan view of PV panel frame with panel installed.
105—Portion of a larger PV panel array.
107—Individual PV cells in panel array.
108—Fixed frame assembly.
110—Photovoltaic (PV) panel.
115—Movable or moving frame.
117—Roof access.
118—Long strut, or fixed frame
119—Short strut
120—Release handle assembly.
121—Release handle rotation pin.
122—Release latch.
125—Spring.
130—Spring mount.
135—Hinge.
140—Flywheel.
145—Flywheel cable.
150—Optional roof edge release cable.
160—Roof joists.
165—Underlayment.
170—Roofing.

Please note that PV panel arrays are typically installed on a sloped roof, or on a support structure such that the fixed array is sloped, ideally such that a midday sun angle is normal to the panel active surfaces. The terms "plan view," and "vertical" use as a reference plane the plane of the PV panels, rather than horizontal relative to the earth.

Figure 1:
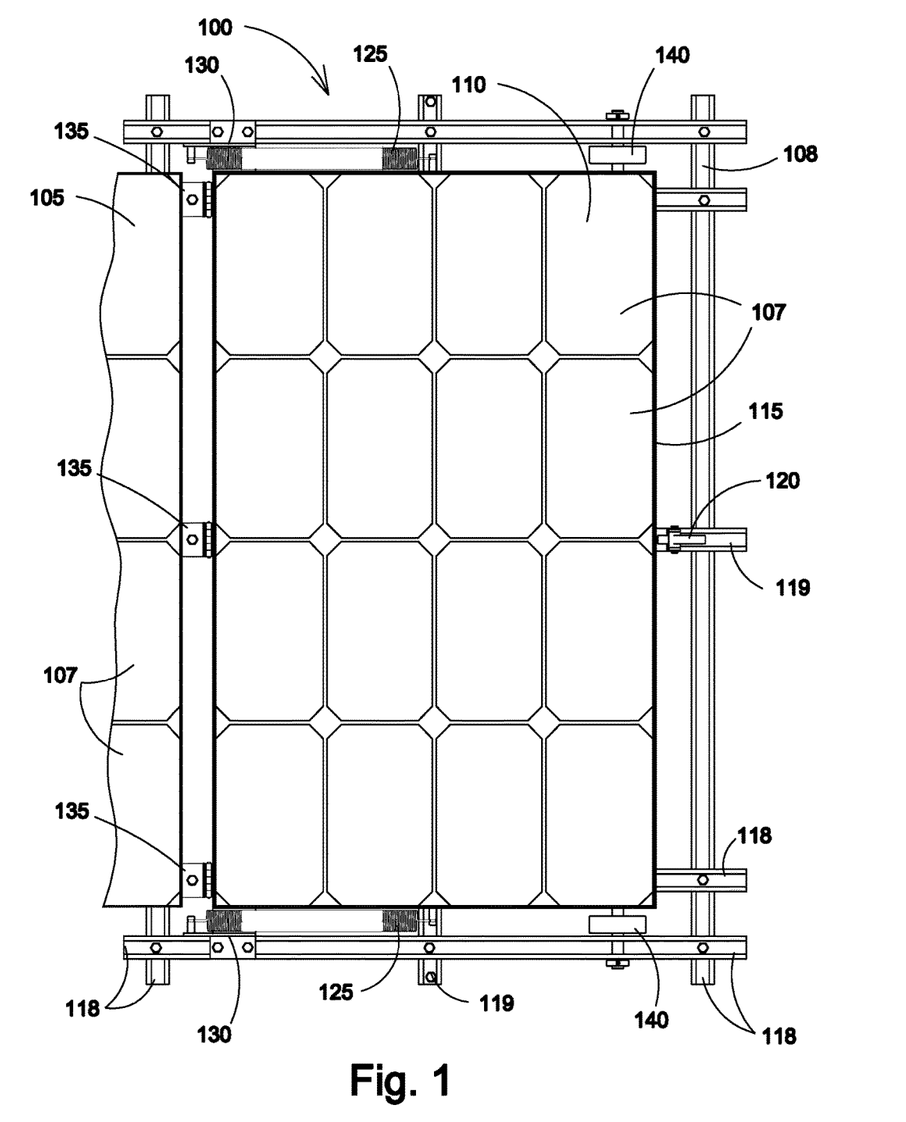
FIG. 1 shows a plan view of an embodiment with a PV panel installed and secured in an operative position.

Turning now to FIG. 1, we see a plan view 100 of an embodiment with the moving frame 115 in an operative position. A plan view may be interpreted as either an overhead view, or a view that is normal to the mounting plane of the PV panel. A typical PV panel 110 comprises an array of individual PV cells 107, as shown here. Such PV cells 107 may be truncated circles, rather than truncated rectangles as shown in the Figure. A purchasable PV panel 110 includes multiple PV cells 107 mounted permanently in a PV panel frame.

When we refer to a "panel," we usually mean a moving frame 115 (FIG. 2) with the cells 107 installed. FIG. 1 shows the panel 110 installed in an operative position, thus obscuring elements underneath.

Typically, an embodiment with installed panels is part of a larger, operative, PV array. A portion of panels in the larger array is shown at 105. However, there is no requirement that embodiments be part of a larger array, or that embodiments be mounted adjacent or proximal to a larger array, or that panels mounted in embodiments are co-planer with a larger array. A panel mounted in embodiments is typically electrically part of the larger array, however, it may be electrically separate. One advantage of being electrically separate is the ease with which it may be electrically isolated. One advantage of being part of the same electrical system is simplicity. We generally do not discuss electrical and power connectivity herein. A PV panel mounted in an embodiment is typically electrically connected to a controller and then to a power grid or electrical system, the same as other, fixed PV panels, such as those in the larger array. Note than any electrical wires from the moving frame 115 must be arranged so they are mechanically free to rotate along with the panel. An optional electrical connector may be used. A preferred embodiment is that electrical connectivity is maintained during all three positions of a panel in an embodiment.

108 shows one embodiment of a fixed frame. The frame may be constructed of struts, such as long struts and short struts. Reference designator 108 is shown at a long strut of the fixed fame. The fixed frame is ideally constructed using either standard struts or struts that are used for mounting in the larger PV array. It is advantageous that elements of embodiment share as many component or element types as will already be in use in the larger array.

Two springs are visible, 125. Springs may be of a different type, and located differently than as shown in this Figure. The panel end of the spring(s) is mechanically connected to the moving frame 115. The fixed end of the spring is connected to a spring mount 130, which in turn connects mechanically, directly or indirectly, to the fixed frame. A spring mount may be mounted directly on a roof, for example.

135 shows hinges, which create a rotational axis around which the moving frame rotates from an operative position to an access position. Such hinges may comprise any element or combination of elements that effect or allow such a rotation. They may be a traditional barrel hinge, with a pin and a sleeve or knuckle that create a mechanical bearing with one degree of freedom. A single hinge may be used, such as a piano hinge, or any number of individual hinges. Three hinges 135 are shown in the Figure. An element that creates an axis of rotation for the fixed frame may be used as the hinge. For example, a hinge(s) may be constructed of a flexible material. Such hinges are well known, such as are commonly used to secure caps on containers of liquid consumer products. Hinges have many different physical structures and names, such as barrel hinge, spring hinge, pivot hinge, butt/mortis hinge, flex hinge, case hinge, piano hinge, concealed hinge, butterfly hinge, flag hinge, strap hinge, H hinge, HL hinge, auto car door hinge, countertop hinge, flush, coach, rising butt, double action spring hinge, double action non-spring hinge, cranked hinge or stormproof hinge, lift-off hinge, and self-closing hinge. Note that some hinges such as those used commonly on car doors and cabinet doors, contain multiple individual elements and more than one internal rotation. Nonetheless, they operate to create an axis of rotation, and are included in our definition of hinge. In addition, some hinges have an axis of rotation that shifts slightly during operation, such as cabinet hinges. Despite the shifting axis of rotation, we still included in these our definition of hinge.

The hinge 135, ideally, permits approximately 180° of rotation of the moving frame 115. However, only 90° or somewhat less is the minimum requirement. The moving frame 115 must rotate enough to provide the desired roof access. Embodiments may permit or require the moveable frame to be mounted above adjacent panels in the larger array to permit the moving frame 115 to sit flat, or nearly flat, on the adjacent array in the folded position. Such an offset may also permit the panel frame to not interfere with an adjacent panel in the larger array when raised to an access position. An axis of rotation may be near a lower edge of a moving frame 115 or PV panel 110 or near an upper edge, noting that this affects the location of the moving frame 115 in both an access and folded positions. In FIG. 1, we also see a portion of a release handle assembly 120. Suitable materials for a hinge include brass, stainless steel, and flex plastic. High-strength aluminum may be used. Suitable outdoor rated, UV-resistant plastics include HDPE, PTFE, PCTFE and ECTFE. For a flex hinge, UV-resistant polypropylene PP or polyethylene PC may be used. Note that the hinge needs considerable strength to handle the unbalanced weight of a PV panel and its associate moving frame.

We also see a plan view of one or more flywheels 140. Flywheels are discussed more below. The flywheel functions as one embodiment of a rotational damper.

Figure 2:
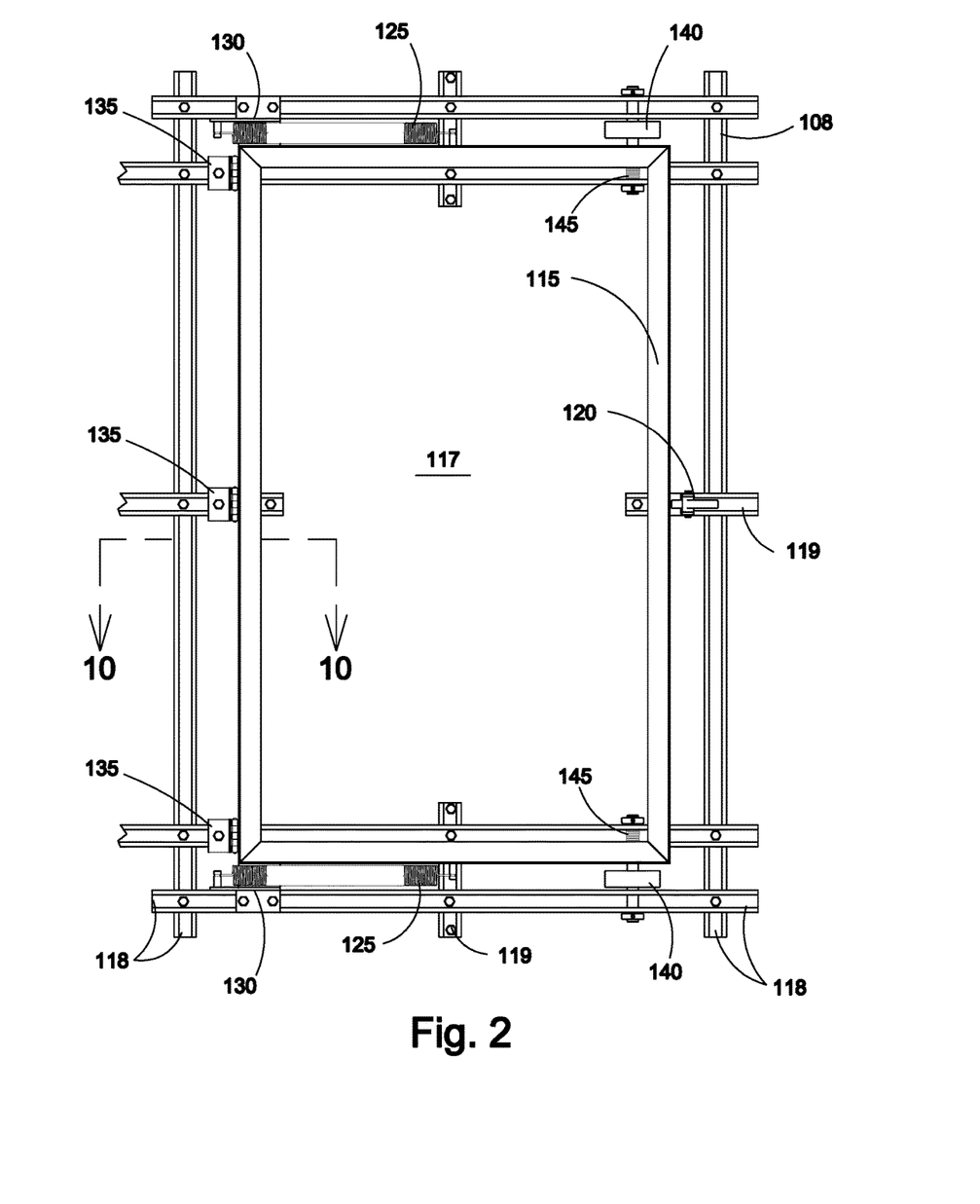
FIG. 2 shows a plan view with PV panels removed.

Turning now to FIG. 2, we see the plan view of FIG. 1, with the PV cells 107 removed from PV panel 110 removed in order to see obscured elements below. Note that normally it is not possible to separate the PV cells 107 from a PV panel or PV panel frame, as together these make up a solid, commercial PV panel. In another embodiment, a frame of a PV panel 110 is part of a moving frame 115. The moving frame 115 may be constructed of welded aluminum square tubing, for example. In FIG. 2, roof access 117 is visible.

Continuing with FIG. 2, ten strut sections are shown as part of the fixed mounting frame 108. These include two long and four medium length struts creating a perimeter 118 of the fixed frame, and four shorter struts 119 that project a short distance inward from the perimeter, typically located at approximately the mid-point of the four sides of the fixed frame, and two additional medium length struts, here shown supporting hinges 135. Note that short struts 119 are short specifically so they do not intrude into the roof access area 117. Other embodiments use other mechanical arrangements to construct a suitable fixed frame. More or fewer struts may be used. Structural elements other than struts may be used, including solid elements; hollow elements; channel-shaped elements, such as U-shapes or I-shapes; or pipe. In some embodiments, portions of the fixed frame may be elements used also for other purpose, such as portions of a roof or support structure. For example, a support structure, such as one constructed of pipe or wood, for example, may also share elements with the fixed frame. In one embodiment proper claim construction includes only those additional elements necessary to implement the embodiment (that is, excluding such shared elements).

In FIG. 2 we also see both the flywheel(s) 140 and the flywheel cable(s)145.

Note that shown in FIG. 2, the vertically oriented (vertical in the Figure; in the plane of the sheet) strut sections are affixed to the roof, while the orthogonal, horizontally oriented (horizontal in the Figure, in the plane of the sheet) strut sections are mechanically secured to the vertically oriented strut sections. However, numerous other arrangements of strut sections are reasonable; those shown are exemplary. Strut sections may be secured to either the roof or other strut sections using traditional mounting hardware for this purpose, or special purpose mounting hardware such as used in the larger PV array. These typically include a bolt and may include elements, such as a spring or friction slide, to allow them to stay in a strut until located and tightened. Ideally, strut sections 118 and 119 are the same, or similar to, struts used in the mounting of the PV panels in the larger array. FIG. 2 also shows the location of cross-section 10-10.

The moving frame 115 is generally a structural element to accept a standard PV panel. However, standard PV panels generally have a strong perimeter frame of their own, such as a perimeter of welded square tubing. In some embodiments, this PV panel perimeter may be used as, or part of, or in place of a separate moving frame 115. That is, some embodiments use a separate moving frame from a commercial PV panel; while other embodiments use an integral commercial PV panel frame as the moving panel 115. Interpretation and construction of elements and claims must take this into account. This is particularly true if an embodiment includes a PV panel. That is, some embodiments include only the necessary elements to accept a separate PV panel, while other embodiments include a functional PV panel or functional PV cells. A PV panel perimeter frame may be secured to a hinge, for example, by the use of clamps, straps, pins, holes, screws, rivets, welds, gluing, magnets, and the like. In such embodiments, the PV panel as a whole, or the perimeter structure of the PV panel, may be viewed as the moving frame 115. An alternative embodiment uses as a moving frame 115 only those elements that are not part of the standard PV panel but do in fact move with the PV panel during rotation. In such an embodiment, the physical elements of the moving frame 115 may be minimal, such as a portion of a hinge, or an element to attach a spring or damper to the PV panel. Attachment points or elements to attach a spring and damper to a moving frame 115 may share a single attachment point or element.

Figure 3:
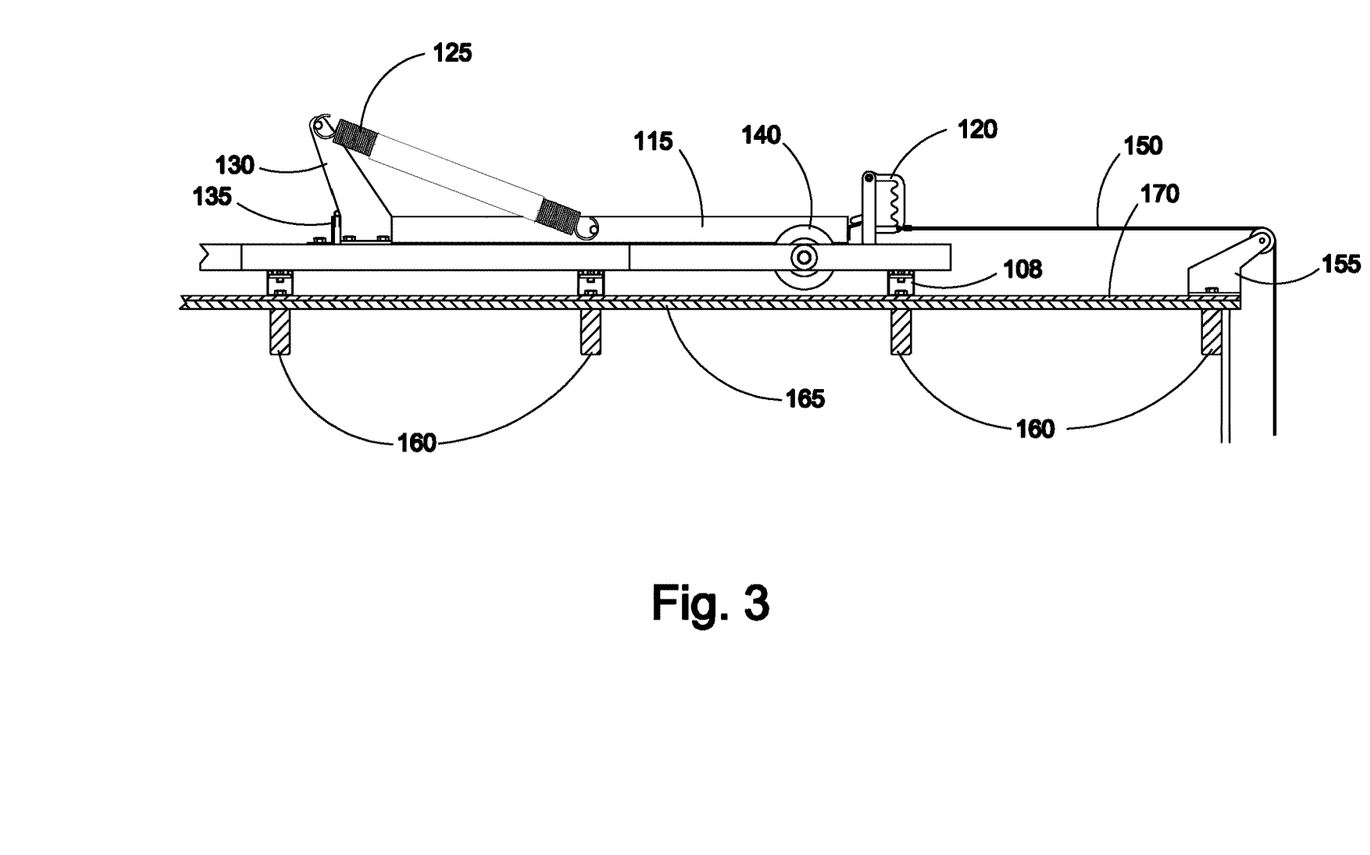
Figure 4:
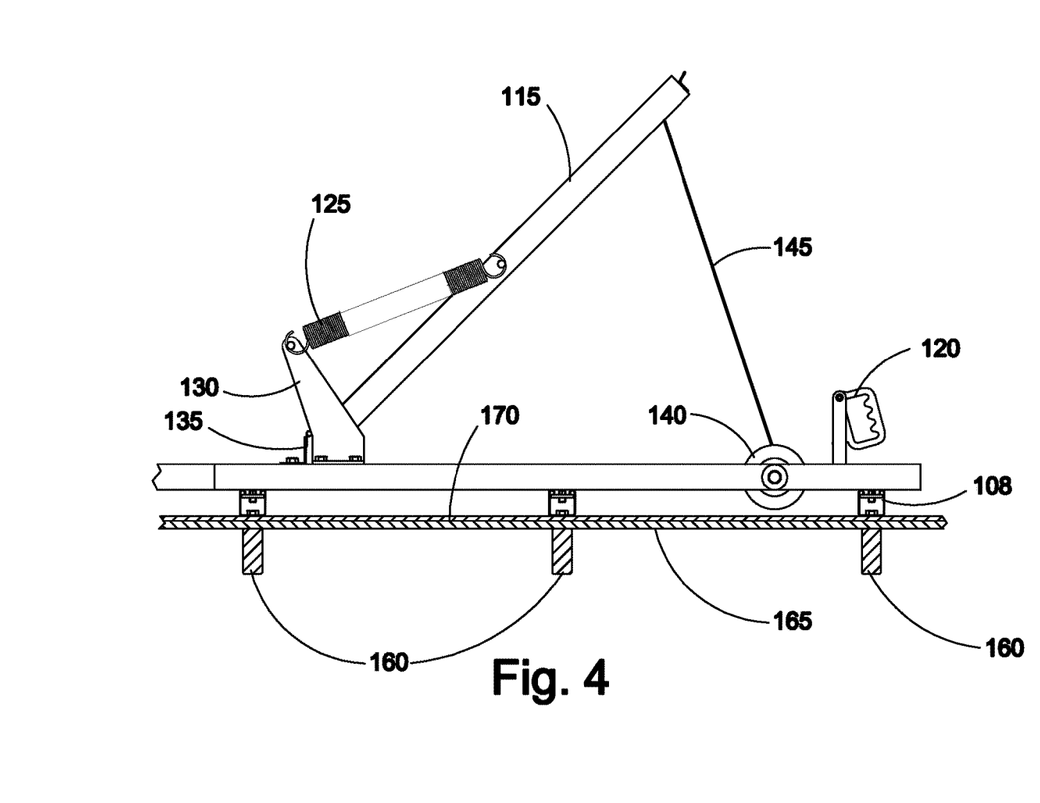
FIG. 4 shows a side view of a panel in an intermediate position between operative and access positions, also showing a damper cable.
Figure 5:
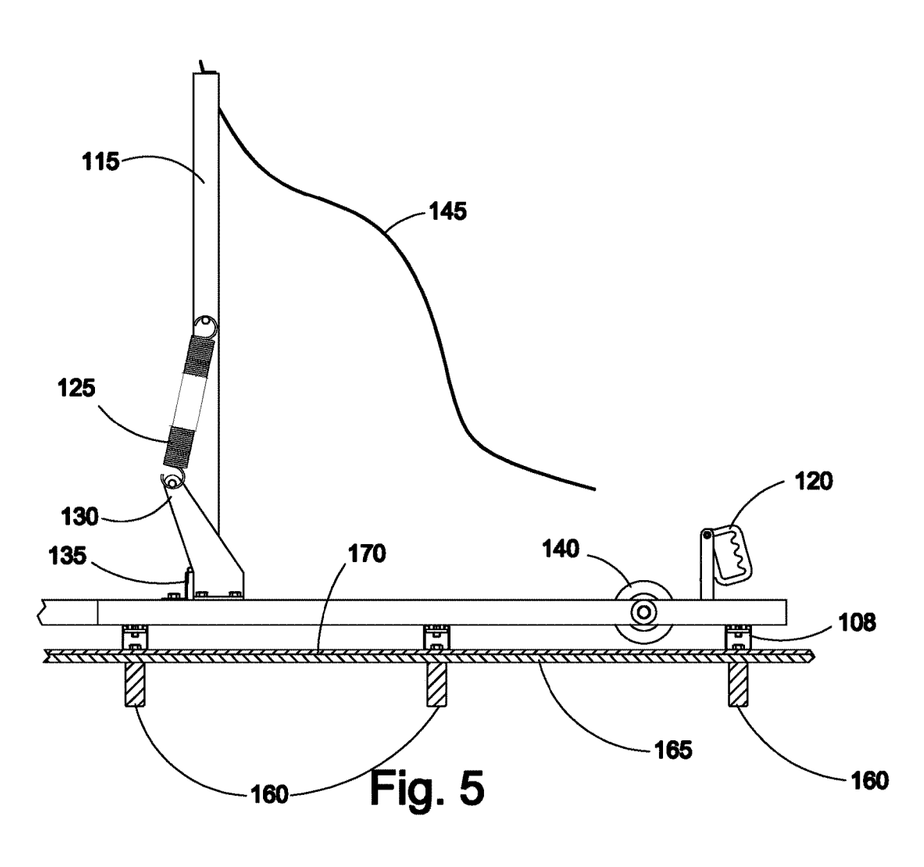
FIG. 5 shows a side view of a panel in an access position.

FIGS. 3, 4 and 5 together show exemplary use of an embodiment, as the moving frame 115 moves from an operational position in FIG. 3, through an intermediate position in FIG. 4, to an access position in FIG. 5.

FIG. 3 shows a side view of an installed embodiment, including roof 170 (in FIG. 7) with an underlayment 165 and roof joists 160. Note that struts such as part of the fixed frame 108 are shown secured through the roof into roof joists 160. Strut mounting hardware may include a gasket or sealing material around the roof penetrations. The PV panel or moving frame 115 is visible. Spring 125 is clearly visible. In this embodiment there are two springs 125, one on each side of the moving frame 115. These are extension springs; however, other embodiments may use compression or torsion springs. The movable end of the spring 125 is held, here with a simple pin, to the moving frame 115. The fixed end of the spring 125 is held, here with a simple pin to a spring mount 130, which is in turn is mounted directly or indirectly to the fixed frame 108. When the moving frame 115 is in the operative position, FIG. 3, the spring(s) 125 are under tension. Roof joists 160 would not normally be part of embodiments; however, if the roof joists 160, or similar elements, are used also as part of a fixed frame, then such elements may also be part of one embodiment.

When the moving frame 115 is moving through an intermediate position, FIG. 4, the spring(s) 125 have returned partially to their short, or relaxed state. When the moving frame 115 is in an access position, FIG. 5, the spring(s) 125 are in their short, relaxed state. For the shown embodiment, the orientation of the spring mount 130 and the fixed end of the spring are such that the spring is shortest when the moving frame 115 is vertical. Any movement of the moving frame 115 past vertical will cause the spring to again stretch. This causes the moving frame 115, once released from its latch in an operative position, to remain approximately vertical or in the access position. Note that "vertical" does not need to be true vertical, as explained elsewhere herein. It needs to be only raised enough to permit roof access through 117 (FIG. 2). Thus, construction of the term "vertical" is "rotationally raised," In some embodiments, the "vertical" position is itself an intermediate position, where a stable position is resting, folded, or face down, on or proximal to the adjacent PV array. In installations where there is no adjacent PV array, the folded position may be construed as simply "face down," such that roof access 117 is unobstructed. This face down position is not shown in Figures. However, the PV cells shown in FIG. 1 would then be facing, approximately, the cells shown as 105 in FIG. 1. A face down position may be an access position.

The perimeter of the fixed frame 108 nominally defines the roof access area 117 as interior to the perimeter, or as a central portion of fixed frame 108. The perimeter of frame 108 is not necessarily continuous and it does not necessarily fully surround area 117. Portions of a perimeter may be missing or modified to create a larger or more convenient roof access area 117. A perimeter of fixed frame 108 may be larger or even significantly larger, or shaped differently, than as shown in FIG. 2. The term, "circumferentially defines," should be construed in this light.

Spring mounting plate(s) 130 may be constructed of a flat plate, bent at the bottom to accept two mounting bolds, as shown in FIG. 3, and comprising a pin, shown, to attach the moving end of spring(s) 125. Many other suitable shapes of spring mounting plate(s) 130 are suitable, as are many other arrangements of securing the ends of spring(s) 125. A spring support or spring mount 130 may be constructed from a plate or any of many other suitable mechanical arrangements and materials, such as open frame, angle brackets, struts, U- or I-channels, and the like.

Suitable materials for mechanical elements 105, 108, 115, 118, 119, and 130 include steel, aluminum, and structural plastic, such as glass-reinforced molded or extruded plastic. Carbon fiber or fiberglass may be used. Steel should typically be stainless steel, plated, galvanized or painted. Aluminum may be anodized. Plastic elements should be UV resistant.

Many different types of springs may be used. Shown in Figures is a conventional steel extension spring with loop ends. A compression spring may be used with a different mounting arrangement. For example, a compression spring could be located between the fixed frame and the moving frame, wherein it is compressed in the operative position and natural, or extended, in the vertical or other access position. Alternatively, one or more torsion springs could be used. The centerline of conventional torsion spring(s) may be close to a rotational axis point, or the axis or pivot of the hinge(s). Such a rotational axis point is shown approximately at point 135 in FIG. 4. Leaf springs may be used in an alternative embodiment. In one embodiment, one or more springs "throw" the moving panel from the operative position to an approximately vertical or other access position. That is, the spring provides an initial rotating force, with the moving frame 115 then continuing via rotational inertia to a vertical or other access position. This is not a preferred embodiment, as the PV panels are heavy and ideally should not move rapidly, due to a risk of injury or damage. In another embodiment, a counter-weight may be used in place of or in addition to a spring. For example, a counterweight may extend off the edge of a building or off the edge of a support structure. A counterweight may be lower cost than springs, but would require a more customized installation. For the purpose of claim construction, such a counterweight should be considered a "spring." In this embodiment, potential energy to rotate the moving frame is supplied by gravity, not by a metal spring or compressed gas. For implementation, a cable from such a counterweight could be secured to the moving frame 115 at the same point as shown in FIG. 4 with a pin shown at the movable end of spring 125. The cable would continue over an edge of a roof or panel array support structure, via a pulley or curved running surface, rather than mount to the spring mount 130.

In yet another embodiment, a spring comprises compressed gas, such as in a cylinder or bag. Although simple, such an embodiment may suffer from leakage of the gas. A compressed gas cylinder may operate either as an extension spring or compression spring. A vacuum or partial vacuum may be used in place of compressed gas.

Yet another embodiment uses a "single-use" gas canister as the source of potential energy for a spring. This embodiment may not suffer from gas leakage, but the gas canister would need to be replaced after each emergency use. Yet another embodiment uses a squib to provide the motive force for rotation. Note that, like a fire extinguisher, single use appliances may be acceptable due to the infrequency of fire emergencies. The term, "spring," needs to be broadly construed to include any element that provides a rotational force on the moving frame to cause it to move from an operative position to an access position.

Continuing with FIG. 4, we see a flywheel 140 and a flywheel cable 145. More than one flywheel and cable may be used. The flywheel slows the motion, due to the rotational inertia of the flywheel, of the moving frame 115 under power of the spring 125 when the moving frame 115 is released to move from an operative position to an access position. A flywheel cable 145 is shown, connected at the distal end of the moving frame 115, either permanently or removably. The flywheel cable 145 is connected at the other end, the "flywheel end," to the flywheel, either permanently or removably.

Turning now to FIG. 5, we see the moving frame 115 in or near an access position. An approximately vertical position may be considered an access position, noting first that the reference is from a plane of the PV panels, and second that the access position may not be perfectly vertical. For example, the access position may vary from 45 to 90 degrees from vertical. We again see flywheel 140 and flywheel cable 145. In this position the flywheel cable 145 is free—no longer connecting the flywheel motion to the moving frame motion. A preferred embodiment is that the flywheel end of the flywheel cable 145 is connected to the flywheel 140 such that when the moving frame 115 reaches or is close to the vertical position the cable automatically releases from the flywheel. This may be implemented with a simple hook, or by placing the end of the cable through a hole in the flywheel, for example. An alternative embodiment is to have the panel end of the flywheel cable drops free of the moving frame 115 when the panel is at or near its vertical position. The purpose of having the flywheel cable automatically free itself from a mechanical connection between the flywheel and the moving frame 115 is so that the spinning motion of the flywheel has no effect on the moving frame 115 once it has reached an access position.

In some embodiments, the access position is not vertical, but is rather at or near a folded position. Use of a torsion spring, compressed air or a counterweight are methods of achieving a rotational force through 180° from an access to a folded position. Another method is to use the weight of the panel to move past vertical to the folded position. A spring mount 130 with its own rotational pivot may be used to provide spring force through all or a portion of the full 180° from an operational position to a folded position.

To restore the embodiment to an operative position, a user simply reconnects the flywheel cable, which would typically be done by hand without the use of tools. As the panel is pushed downward, typically by hand with no tools, from a vertical or other access position back to an operative position, the spring(s) 125 are extended. The flywheel 140 may need to be turned by hand to wind the flywheel cable 145 back around the flywheel. When the moving frame 115 is in the fully operative position, the panel latch 122 is re-engaged. Ideally, such re-engagement is automatic; however, the panel latch 122 may have to be placed in the latch position manually, ideally without the use of tools.

In some embodiments the moving frame 115 may be manually pushed towards a "folded" position. As shown, this will slightly stretch spring 125. Note, however, that the mounting point of the spring 125 on the spring mount 130 is above the top of the moving frame 115 when the panel is fully in the folded position. This means that the spring will serve to hold the panel in the folded position, without the use of an additional latch for that position. An alternative embodiment uses a latch to hold the panel in the folded position, if desired. In yet another embodiment the spring 125 may still be providing rotational force, towards the vertical position, on the moving frame 115. However, the weight of the panel exceeds this force, and so the panel will stay in the folded position without the use of a latch. A release latch may be called simply, a "latch."

Suitable materials for the flywheel 140 include steel, aluminum, and UV-resistant plastic. A flywheel may contain sand or other filler weight. Suitable materials and construction of the flywheel cable 145 include steel cable, weather resistant rope, string, chain, cable, webbing, and the like. Stainless steel cable is preferred.

Bumpers may be used between the moving frame 115 and elements it might touch, such as the fixed frame 108 or a PV panel adjacent in the full PV array. Bumpers might be placed on the moving frame 115, or on a fixed surface. Bumpers may be rubber, air-filled rubber bumpers, or other material.

In one embodiment the flywheel may include damping. One method of damping is for the flywheel to contain a viscous material such as sand or liquid, and internal baffles, vanes, shelves, shovels or rods such that rotation of the flywheel causes the internal elements to pass through the viscous material. This will cause the flywheel to resist rotation, implementing damping. In such an embodiment, the flywheel is either a damping element or comprises a damping element. The flywheel 140 may be significantly larger than as shown in FIG. 5. A larger flywheel has the advantage, that for the same weight, its rotational inertia may be greater. It also permits a relatively small amount of cable 145 motion to cause a large amount of flywheel 140 rotation. In addition, a larger flywheel 140 may more easily contain a larger, passive damping element, such as a viscous material. Viscous material may be as air, water, other fluids, plastic beads, or sand, for example. In some embodiments, it is not the rotational inertia of the flywheel that limits the rotational speed of the moving frame, but rather resistance created by motion of flywheel elements through the viscous medium. Such motion may be either linear, as in a dashpot, or rotational, such as a sand-filled flywheel with internal vanes. A damper may be mounted on the fixed frame, the moving frame, or both. Connection to the damper may be via a cable, as shown in Figures, or rigid rods, or hydraulically.

Flywheel 140, as connected to the moving frame 115, implements damping, and as such is a damping element also called a rotational damping element. Embodiments may use other types of damping elements, including fluid-filled damping cylinders; shock absorbers; automotive struts; friction motion dampers; gas, liquid or hydraulic dashpots; air vanes, a rotational speed governor, and the like. A flywheel 140, or a similar rotating cylinder, may have an internal centrifugal governor that causes braking when the rotational speed is above a threshold. In such an embodiment, it may not be necessary for the flywheel cable 145 to free itself from the flywheel because the speed of the flywheel and the angular speed of the moving frame 115 is not high enough to cause significant "overshoot" of the panel past the vertical position. If a damping element comprises a cylinder, such as a shock absorber or dashpot, the damping element may be positioned similarly to the spring 125. Such a damping element may be located to the side of the spring (from a plan view), or inside the spring, or surrounding the spring. In one embodiment, the damping element is a dashpot open or partially open to the air. The dashpot may be made of stainless steel, anodized aluminum, or UV resistant plastic. An open dashpot should be protected against accumulating water, dirt, and animals. A damper is a critical part of embodiments, as it prevents a moving frame, with a PV panel, from rotating so fast as to risk injury or damage. A damper is a physical element, although embodiments of this element may vary significantly. When a flywheel implements damping partially or fully using a viscous material, the term, "flywheel" might better be simply, "rotational damper."

FIGS. 3, 4 and 5 also show a release handle 120. The purpose of the release handle is to have a very simple, very reliable, release mechanism that requires no training or prior experience to use. The handle may be bright red, for example, and signage on or nearby that says, for example, "PULL FOR FIRE ACCESS TO ROOF." Pulling the release handle releases release latch 122. There are multiple types and arrangements for a release latch. The release latch holds the moving frame 115 in the flat, operative position such as shown in FIG. 3, until the release handle 120 is pulled. Alternative embodiments for the release handle movement include pushing, lifting, pressing and rotating. When we speak of "pulling," the release handle 120, we mean any manual motion of the release handle that releases the release latch 122. Suitable materials for a release handle are steel, such as stainless steel or galvanized steel, anodized aluminum, or a strong, outdoor-rated, UV-resistance plastic.

Figure 6:
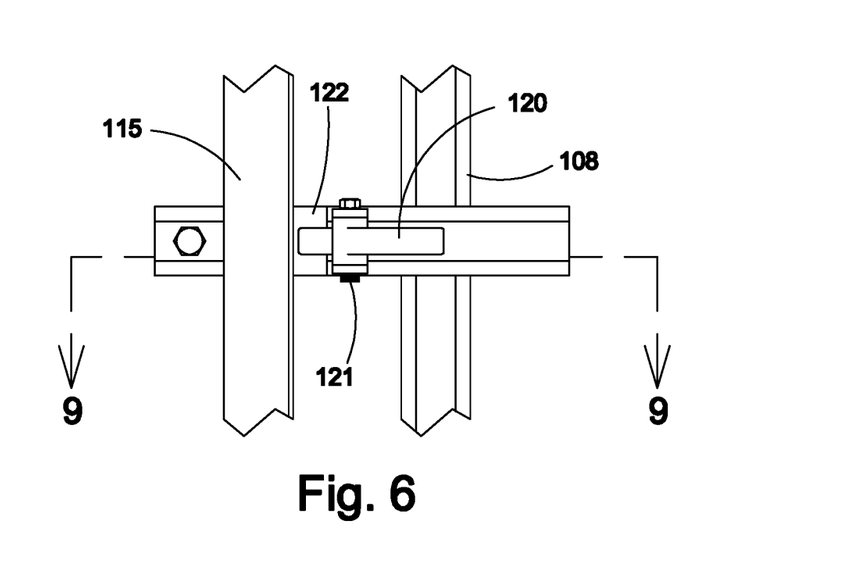
FIG. 6 shows a plan view detail of a release handle.

FIG. 6 shows a plan view detail of one embodiment of a release handle 120, a release latch 122 and a release handle pin 121. FIG. 6 also shows the location of cross-section 9-9.

Figure 7:
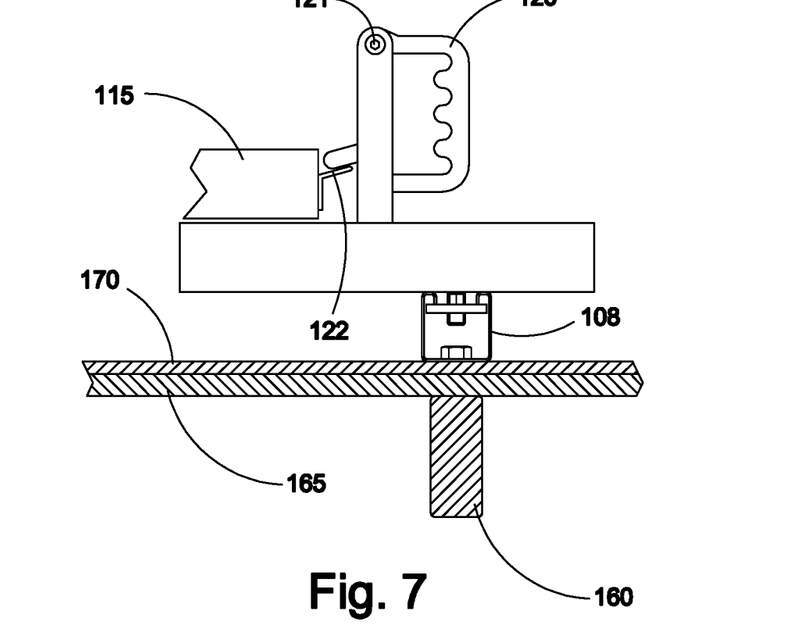
FIG. 7 shows a side view detail of a release handle and release latch.

FIG. 7 shows a cross-section, where the release handle 120, the release latch 122, moving frame 115, and a portion of fixed frame element 108 are visible. The release handle 120 rotates around pin 121, when operated, such as pulled.

Figure 10:
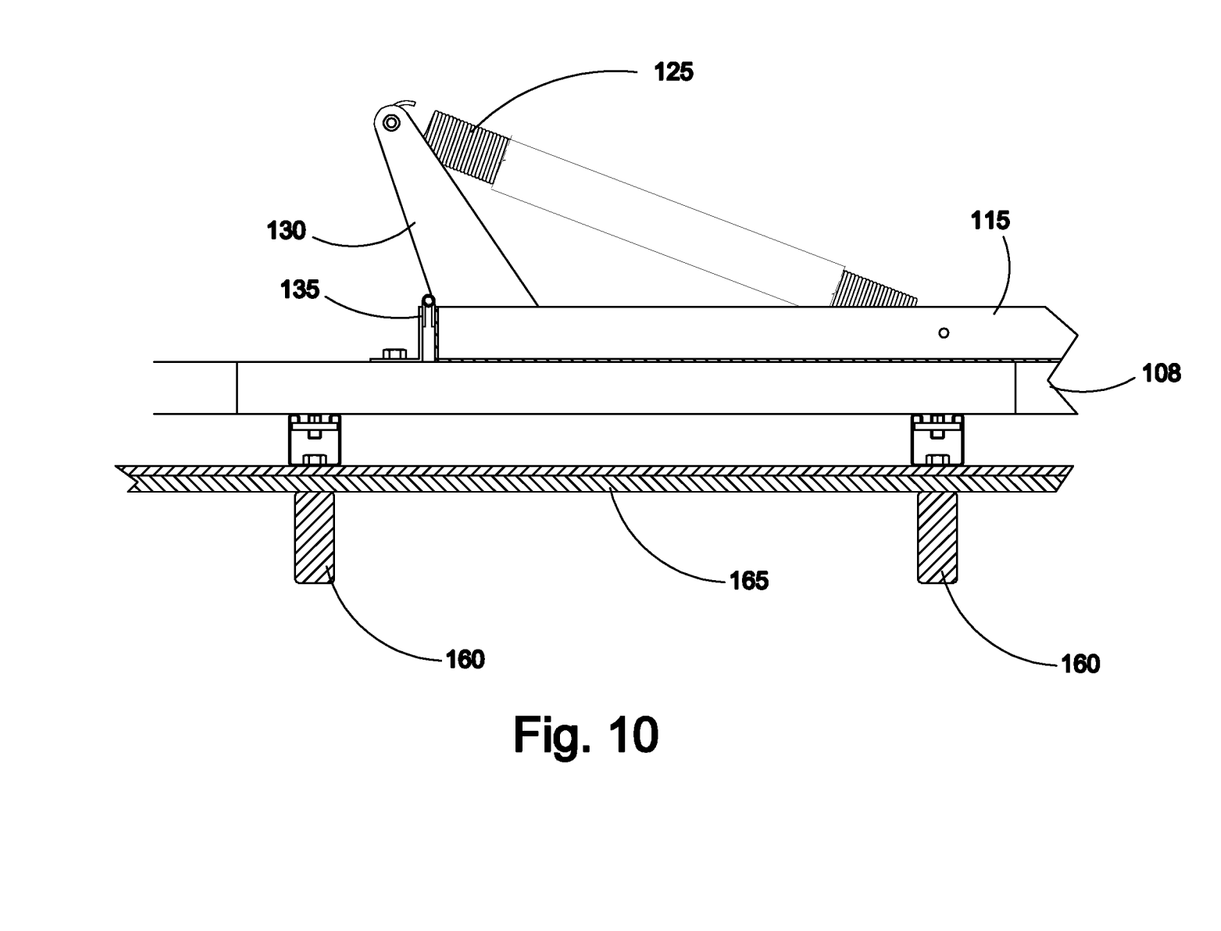
FIG. 10 shows a cross-section of a hinge and spring taken on line 10-10 in FIG. 2.

Note that in this embodiment the release latch is angled slightly such that pulling the release handle 120 causes the moving frame 115 to move slightly against the force of spring 125 (see FIGS. 3 and 10). Thus, the spring force holds the release latch 122 and the release handle 120 firmly in position until the handle is pulled.

FIG. 7 also shows a schematic arrangement of roof underlayment 165, roofing 170, and roof joists 160. FIG. 7 shows a portion of the release latch attached to the moving frame 115 and a portion attached to or part of the release handle 120, which is in turn mounted directly or indirectly on the fixed frame. In another embodiment the release handle is mounted on the moving frame and a portion of the release latch is mounted on or is part of the fixed frame. In either embodiment, a motion of the release handle releases the release latch, which then causes the moving frame, under the force of the spring, to move from an operative position to an access position.

Latch mechanisms may be as shown in FIG. 7, comprising one or more protrusions that touch or otherwise removably mate. Alternative latches may include magnetic clamps, straps, hook and loop fasteners, snaps, zippers, and breakaway elements, for example. Latches may include a pin, ridge, detent, recess, groove or shelf. The latch embodiment in FIG. 7 is non-limiting.

Figure 8:
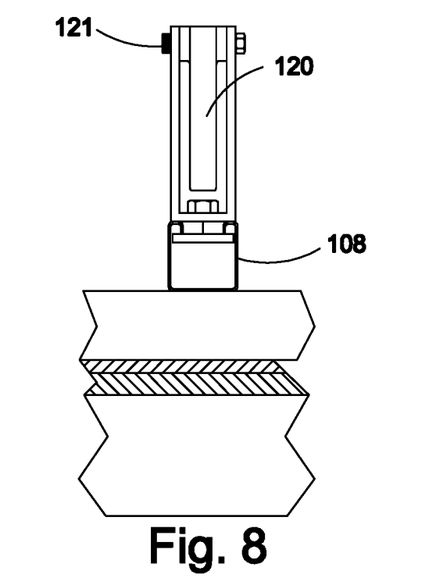
FIG. 8 shows an end view detail of release handle.

FIG. 8 shows an end view detail of a release handle 120, release handle pin 121, and a portion of fixed frame 108.

Figure 9:
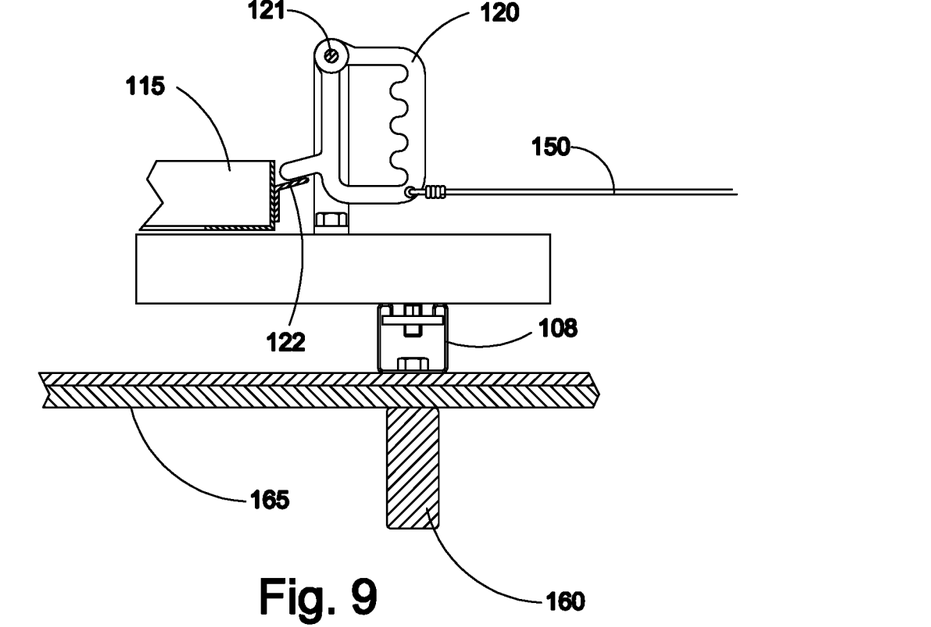
FIG. 9 shows a cross-section of a release handle and release latch taken on line 9-9 in FIG. 6.

FIG. 9 shows a cross-section at 9-9 of a release handle 120, release handle pin 121, release latch 122, and a portion of fixed frame 108. An optional release cable 150 is shown. Such a cable may go to a remote release handle, such as over the side of a roof, such as on a wall. A remote release handle may also function to electrically disconnect a PV panel array from a power grid or other electrical wiring. In this way, a single handle provides two functions typically used by firefighters. The electrical disconnect may be implemented directly, by a series electrical switch in the wiring, or indirectly such as via a PV panel array controller. Embodiments include more than one release handle. Ideally, if there is more than one release handle, they look the same or similar, and perform the same or similar functions. For example, a proximal release handle 120 may also electrically disconnect roof PV panels.

FIG. 10 shows an embodiment at cross section at 10-10 of a spring detail, showing a spring 125, a spring mount 130, a portion of moving frame 115, and hinge 135. In one embodiment, a spring comprises one or more leaf springs. A cam may be positioned such that rotation of the moving frame causes the cam to depress the leaf spring when the moving frame is in the operative position and not depress the leaf spring when the moving frame is in the access position. The force of the leaf spring against the cam is the force that rotates the moving frame away from the operative position. The cam may be directly or indirectly affixed to the moving frame. The ends of the leaf spring are directly or indirectly affixed to the fixed frame. The center of the leaf spring is free to be deflected by the cam. The cam, surface of the leaf spring, or an intermediate element may comprise a self-lubricating material, such as Nylon or another synthetic polymer, polypropylene, and the like.

From a practical viewpoint, embodiments may be constructed, distributed, sold and installed in various levels of completeness. For example, one embodiment may include a PV panel, while others do not. As another example, one embodiment may include all elements of a fixed frame, while another embodiment may include few elements or almost no elements. In such embodiments, the fixed frame comprises those elements that do not move when the moving frame 115 rotates. Proper construction of claimed embodiments must have the flexibility to cover various commercial product implementations. A goal is to have construction of claims include product variations where various standard mechanical elements are left out. In such cases, an installer or user might easily acquire such standard elements from another source.

A "fixed frame" element in a claim may include few or no struts; it may include only a spring mount.

A "moving frame" element may include few structural elements, as in some embodiments the frame around a PV panel makes up most of the moving frame. A moving frame may comprise only a portion of a release latch, for example, or attachment elements for a spring, damper or damping cable, or hinge mount elements. A claim term, "accepts a PV panel," should be construed to include embodiments where the PV panel itself is most of a moving frame 115.

A moving frame mechanically interfaces with a fixed frame primarily through three elements: a hinge, a release latch, and a portion of a damper. These three "interface" elements may be construed to be predominantly part of either a fixed frame or a moving frame. Or, they may be separate elements, attached either during product manufacture or during installation to both the fixed frame and moving frame. Claims and claim elements should be construed to cover such practical variations in products.

"Circumferentially defines a roof access region" refers to region between some portions of the fixed frame; such a roof access region is at least partially covered or blocked by a PV panel attached to (or part of) a moving frame 115 in the "operative" or "first" position; and exposed or open to a person when the moving frame is in the "access" or "second" position.

A release latch may be part of a release handle. A release latch may comprise a portion that is a portion of the moving frame or the fixed frame. For example, a release handle may have a projection that extends over a portion of the moving frame or the PV panel itself. The connection point between the release handle and the frame or panel may comprise the release latch.

Photovoltaic panel arrays require installation. Installers use a set of parts to install arrays, such as struts, bolts, and PV panels. Embodiments of this invention may be provided to installers in a wide range of assembly, from nearly complete assembly to a kit of many individual elements. It is the intent of proper claim construction to maintain claim breadth over this full range of pre-assembly or loose parts of claim elements. Mechanical variations that achieve the same result are included in construction of elements and claims. Claims include kits of parts or partially assembled embodiments.

In some applications it is desirable to know remotely the position of the moving frame 115. Therefore, some embodiments include an electrical switch that is responsive to the moving frame 115 being in the operative position or the access position, or both. Another embodiment detects motion of the moving panel. For example, this switch could be connected to an alarm, which then sounds locally or remotely anytime the moving panel moves between these two positions. In one embodiment, a switch is attached to or is part of the release handle or the release latch. In some embodiments, a switch that is responsive to the moving frame 115 connects to a PV controller such that at least the PV panel attached to (or part of) the moving frame 115 is electrically disconnected from an electrical grid or other electrical wiring.

In one embodiment, a PV panel mounted in the embodiment is electrically disconnected automatically when a moving frame 115 is raised from an operative position. For example, one half of an electrical connector may be securely mounted, directly or indirectly, on the fixed frame 108. The other half of the electrical connector may be mounted, directly or indirectly, on the moving frame 115. When the panel is rotated to the access position, the connector opens. When the moving frame 115 is rotated down to an operative position, the connector is closed. In this way, a fire fighter achieves both access to a portion of a roof and disconnects the panel with a single action of a release handle.

In yet another embodiment, the release handle electrically disconnects a full PV array from a power grid. Such a disconnection may be directly in series with the electrical wiring of the full panel array, or it may activate a control input to a PV panel electrical controller. This has an obvious convenience and safety benefit during a fire emergency.

In one embodiment, an electrical-disconnect lever functions additionally as a release handle.

In some applications it is desirable for a fire fighter to release the moving panel to obtain roof access prior to being on the roof. Therefore, in some embodiments, the release handle, or a second release handle, is located off the top of the roof, such as on a wall. A cable 150 may be used, for example, to connect the lower or second release handle to the release latch.

Ideal, Ideally, Optimal and Preferred—Use of the words, "ideal," "ideally," "optimum," "optimally" "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Optional, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims. Claims for devices and systems may be restricted to perform only the methods of embodiments or claims.

I claim:

1. A device to rotate a photovoltaic (PV) panel comprising:
    a fixed frame, configured to be permanently mounted on a support structure, comprising a spring mount;
    a moving frame, configured to receive the photovoltaic (PV) panel, configured to rotate around a hinge axis, comprising a first rotational position and a second rotational position;
    a hinge comprising the hinge axis, operatively connected between the fixed frame and the moving frame;
    a spring, operatively connected between the moving frame and the spring mount;
    a rotational damper operatively connected between the fixed frame and the moving frame;
    a release latch operatively connected between the fixed frame and the moving frame;
    a release handle operatively connected to the release latch;
    wherein the moving frame is configured to rotate around the hinge axis from the first rotational position to the second rotational position;
    wherein the spring provides a rotational force on the moving frame from the first rotational position to the second rotational position;
    wherein the release latch holds the moving frame in the first rotational position until released by a first motion of the release handle without tools;

wherein the fixed frame circumferentially defines a roof access region;

wherein the moving frame, when the PV panel is attached to the moving frame, blocks access by a person to at least a first portion of the roof access region;

wherein the moving frame, when in the second position, does not block access by the person to the first portion of the roof access region; and wherein the rotational damper limits a rotational speed of the moving frame, as the moving frame moves from the first rotational position to the second rotational position, to a predetermined maximum rotational speed.

2. The device of claim 1 wherein:
the support structure is a roof; and
the fixed frame is configured to be permanently mounted on the roof comprising the roof access region.

3. The device of claim 1 wherein:
the hinge comprises one or more barrel hinges.

4. The device of claim 1 wherein:
the rotational damper comprises a linear cylinder comprising a piston and a damping fluid.

5. The device of claim 1 wherein:
the rotational damper comprises a first and a second friction element such that as the moving frame moves from the first rotational position to the second rotational position the first and the second friction elements rub in contact with each other, damping the rotation of the moving frame.

6. The device of claim 1 wherein:
the rotational damper comprises a rotating speed governor.

7. The device of claim 1 wherein:
the spring comprises one or more coiled extension springs.

8. The device of claim 1 wherein:
the spring comprises one or more torsion springs.

9. The device of claim 1 wherein:
the spring comprises a compressed gas.

10. The device of claim 1 wherein:
the spring comprises a counterweight.

11. The device of claim 1 wherein:
the spring comprises a leaf spring.

12. The device of claim 11 further comprising:
a cam, wherein the cam rotates with the moving frame such that the cam depresses the leaf spring when the moving frame is in the first position.

13. The device of claim 1 wherein:
the rotational damper comprises a flywheel and flywheel cable, wherein the flywheel is affixed to the fixed frame and a first, fixed end of the flywheel cable is affixed to the moving frame.

14. The device of claim 13 wherein:
a second, free end of the flywheel cable is removably engaged to the flywheel such that when the moving frame reaches the second rotational position the free end of the flywheel cable disengages from the flywheel.

15. The device of claim 13 wherein:
the flywheel is at least partially filled with a viscous material; and
wherein an interior of the flywheel comprises one or more vanes that pass through the viscous material when the flywheel rotates.

16. A kit comprising the device of claim 1.

17. A method of providing emergency roof access through a photovoltaic roof array comprising the steps of:
mounting the device of claim 1 on a roof; and
manually moving the release handle in the first motion.

* * * * *